＝US009037775B2

United States Patent
Feng et al.

(10) Patent No.: US 9,037,775 B2
(45) Date of Patent: *May 19, 2015

(54) NETWORK FILTERING IN A VIRTUALIZED ENVIRONMENT

(75) Inventors: Jeffrey J. Feng, Round Rock, TX (US); Terry J. Hoffman, Austin, TX (US); Shawn P. Mullen, Buda, TX (US); Bhargavi B. Reddy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 26 days.

This patent is subject to a terminal disclaimer.

(21) Appl. No.: 13/595,005

(22) Filed: Aug. 27, 2012

(65) Prior Publication Data

US 2013/0031233 A1    Jan. 31, 2013

Related U.S. Application Data

(63) Continuation of application No. 13/194,090, filed on Jul. 29, 2011.

(51) Int. Cl.
*G06F 12/08* (2006.01)
*G06F 9/06* (2006.01)
*G06F 9/455* (2006.01)
*H04L 12/00* (2006.01)

(52) U.S. Cl.
CPC .............. *G06F 9/06* (2013.01); *G06F 9/45558* (2013.01); *G06F 2009/45595* (2013.01); *H04L 12/00* (2013.01)

(58) Field of Classification Search
None
See application file for complete search history.

(56) References Cited

U.S. PATENT DOCUMENTS

| 6,674,769 | B1 * | 1/2004 | Viswanath | 370/469 |
| 6,687,220 | B1 * | 2/2004 | Ayres | 370/229 |
| 7,536,715 | B2 * | 5/2009 | Markham | 726/11 |
| 7,664,108 | B2 * | 2/2010 | Bahattab | 370/389 |
| 7,743,107 | B2 | 6/2010 | Kovacs | |
| 7,835,356 | B2 * | 11/2010 | Bar-Kovetz et al. | 370/389 |
| 2009/0172817 | A1 * | 7/2009 | Sedayao | 726/25 |
| 2009/0210872 | A1 | 8/2009 | Dai et al. | |
| 2009/0254990 | A1 * | 10/2009 | McGee | 726/22 |
| 2009/0307444 | A1 | 12/2009 | Cyr et al. | |
| 2010/0107162 | A1 * | 4/2010 | Edwards et al. | 718/1 |

(Continued)

FOREIGN PATENT DOCUMENTS

WO    2010031084 A1    3/2010

OTHER PUBLICATIONS

International Search Authority, State Intellectual Property Office, the P.R China; Application No. PCT/CN2012/074499; International Search Report dated Aug. 9, 2012 (11 pp).

(Continued)

*Primary Examiner* — Kaveh Abrishamkar
*Assistant Examiner* — Janusz Kusyk
(74) *Attorney, Agent, or Firm* — Russell Ng PLLC; Matthew W. Baca (57) ABSTRACT

A physical host executes a hypervisor or virtual machine monitor (VMM) that instantiates at least one virtual machine (VM) and a virtual input/output server (VIOS). The VIOS determines by reference to a policy data structure a disposition of a packet of network communication with the VM, where the disposition includes one of dropping the packet and forwarding the packet. Thereafter, the determined disposition is applied to a subsequent packet in a same packet flow as the packet.

7 Claims, 9 Drawing Sheets

(56) References Cited

U.S. PATENT DOCUMENTS

| | | |
|---|---|---|
| 2010/0293552 A1 | 11/2010 | Allen et al. |
| 2011/0022695 A1* | 1/2011 | Dalal et al. ............... 709/222 |
| 2012/0210318 A1* | 8/2012 | Sanghvi et al. ............... 718/1 |

OTHER PUBLICATIONS

U.S. Appl. No. 13/194,090 entitled "Network Filtering in a Virtualized Environment"; Non-final office action dated Feb. 20, 2013 (21 pg).

U.S. Appl. No. 13/194,090 entitled "Network Filtering in a Virtualized Environment"; Final office action dated Jul. 9, 2013 (20 pg).

U.S. Appl. No. 13/194,090 entitled "Network Filtering in a Virtualized Environment"; Non-final office action dated May 9, 2014 (23 pg).

U.S. Appl. No. 13/194,090 entitled "Network Filtering in a Virtualized Environment"; Notice of Allowance dated Sep. 10, 2014 (8 pg).

* cited by examiner

NETWORK FILTERING IN A VIRTUALIZED ENVIRONMENT

This application is a continuation of U.S. patent application Ser. No. 13/194,090 entitled "NETWORK FILTERING IN A VIRTUALIZED ENVIRONMENT," by Jeffrey J. Feng et al., filed on Jul. 29, 2011, the disclosure of which is incorporated herein by reference in its entirety for all purposes.

BACKGROUND OF THE INVENTION

1. Technical Field

The present invention relates in general to data processing, and in particular, to data processing environments including virtual networks.

2. Description of the Related Art

In general, "utility computing" refers to a computational model in which processing, storage and network resources, software, and data are accessible to client computer systems and other client devices (e.g., mobile phones or media players) on demand, much like familiar residential utility services, such as water and electricity. In some implementations, the specific computational resources (e.g., servers, storage drives, etc.) allocated for access and use by client devices are specified by service agreements between the utility computing provider and its customers. In other implementations, commonly referred to as "cloud computing," details of the underlying information technology (IT) infrastructure are transparent to the utility computing customers.

Cloud computing is facilitated by ease-of-access to remote computing websites (e.g., via the Internet or a private corporate network) and frequently takes the form of web-based resources, tools or applications that a cloud consumer can access and use through a web browser, as if the resources, tools or applications were a local program installed on a computer system of the cloud consumer. Commercial cloud implementations are generally expected to meet quality of service (QoS) requirements of cloud consumers, which may be specified in service level agreements (SLAs). In a typical cloud implementation, cloud consumers consume computational resources as a service and pay only for the resources used.

Adoption of utility computing has been facilitated by the widespread utilization of virtualization, which is the creation of virtual (rather than actual) versions of computing resource, e.g., an operating system, a server, a storage device, network resources, etc. For example, a virtual machine (VM), also referred to as a logical partition (LPAR), is a software implementation of a physical machine (e.g., a computer system) that executes instructions like a physical machine. VMs can be categorized as system VMs or process VMs. A system VM provides a complete system platform that supports the execution of a complete operating system (OS), such as Windows, Linux, AIX, Android, etc., as well as its associated applications. A process VM, on the other hand, is usually designed to run a single program and support a single process. In either case, any application software running on the VM is limited to the resources and abstractions provided by that VM. Consequently, the actual resources provided by a common IT infrastructure can be efficiently managed and utilized through the deployment of multiple VMs, possibly from multiple different utility computing customers.

The virtualization of actual IT resources and management of VMs is typically provided by software referred to as a VM monitor (VMM) or hypervisor. In various implementations, a hypervisor may run on bare hardware (Type 1 or native hypervisor) or on top of an operating system (Type 2 or hosted hypervisor).

In a typical virtualized computing environment, VMs can communicate with each other and with physical entities in the IT infrastructure of the utility computing environment utilizing conventional networking protocols. As is known in the art, conventional networking protocols are commonly premised on the well known seven layer Open Systems Interconnection (OSI) model, which includes (in ascending order) physical, data link, network, transport, session, presentation and application layers. VMs are enabled to communicate with other network entities as if the VMs were physical network elements through the substitution of a virtual network connection for the conventional physical layer connection.

Disclosed herein are techniques for enhancing network filtering in such virtual computing environments.

SUMMARY OF THE INVENTION

In at least one embodiment, a physical host executes a hypervisor or virtual machine monitor (VMM) that instantiates at least one virtual machine (VM) and a virtual input/output server (VIOS). The VIOS determines by reference to a policy data structure a disposition of a packet of network communication with the VM, where the disposition includes one of dropping the packet and forwarding the packet. Thereafter, the determined disposition is applied to a subsequent packet in a same packet flow as the packet.

DETAILED DESCRIPTION OF ILLUSTRATIVE EMBODIMENT

Figure 1:
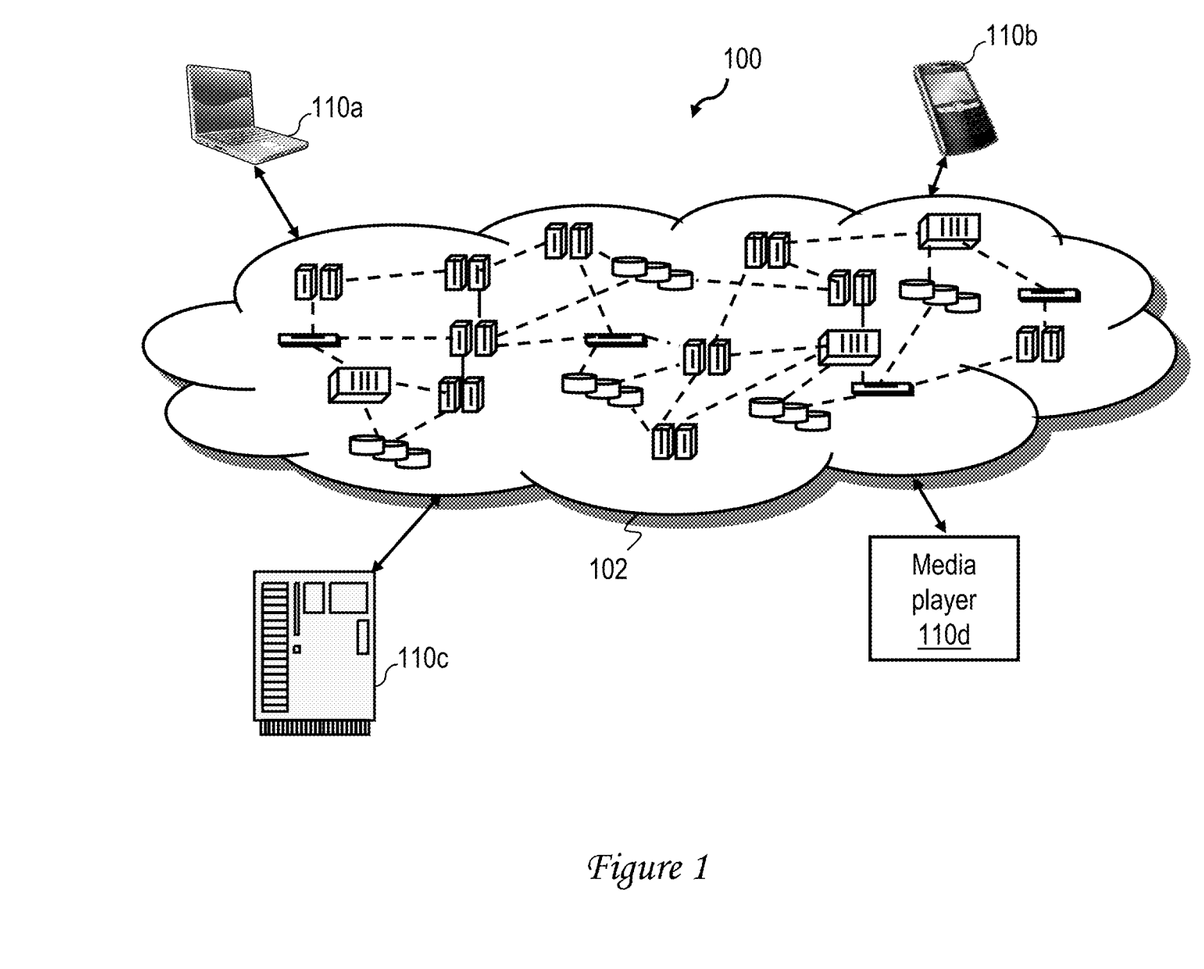
FIG. 1 is a high level block diagram of a data processing environment in accordance with one embodiment.

With reference now to the figures and with particular reference to FIG. 1, there is illustrated a high level block diagram of an exemplary data processing environment 100 in accordance within one embodiment. As shown, data processing environment 100, which in the depicted embodiment is a cloud computing environment, includes a collection of computing resources commonly referred to as a cloud 102. Computing resources within cloud 102 are interconnected for communication and may be grouped (not shown) physically or virtually, in one or more networks, such as private, community, public, or hybrid clouds or a combination thereof. In this manner, data processing environment 100 can offer infrastructure, platforms and/or software as services accessible to client devices 110, such as personal (e.g., desktop, laptop, netbook, tablet or handheld) computers 110a, smart phones 110b, server computer systems 110c and consumer electronics, such as media players (e.g., set top boxes, digital versatile disk (DVD) players, or digital video recorders (DVRs)) 110d. It should be understood that the types of client devices 110 shown in FIG. 1 are illustrative only and that client devices 110 can be any type of electronic device capable of communicating with and accessing services of computing resources in collection 110 via a packet network.

Figure 2:
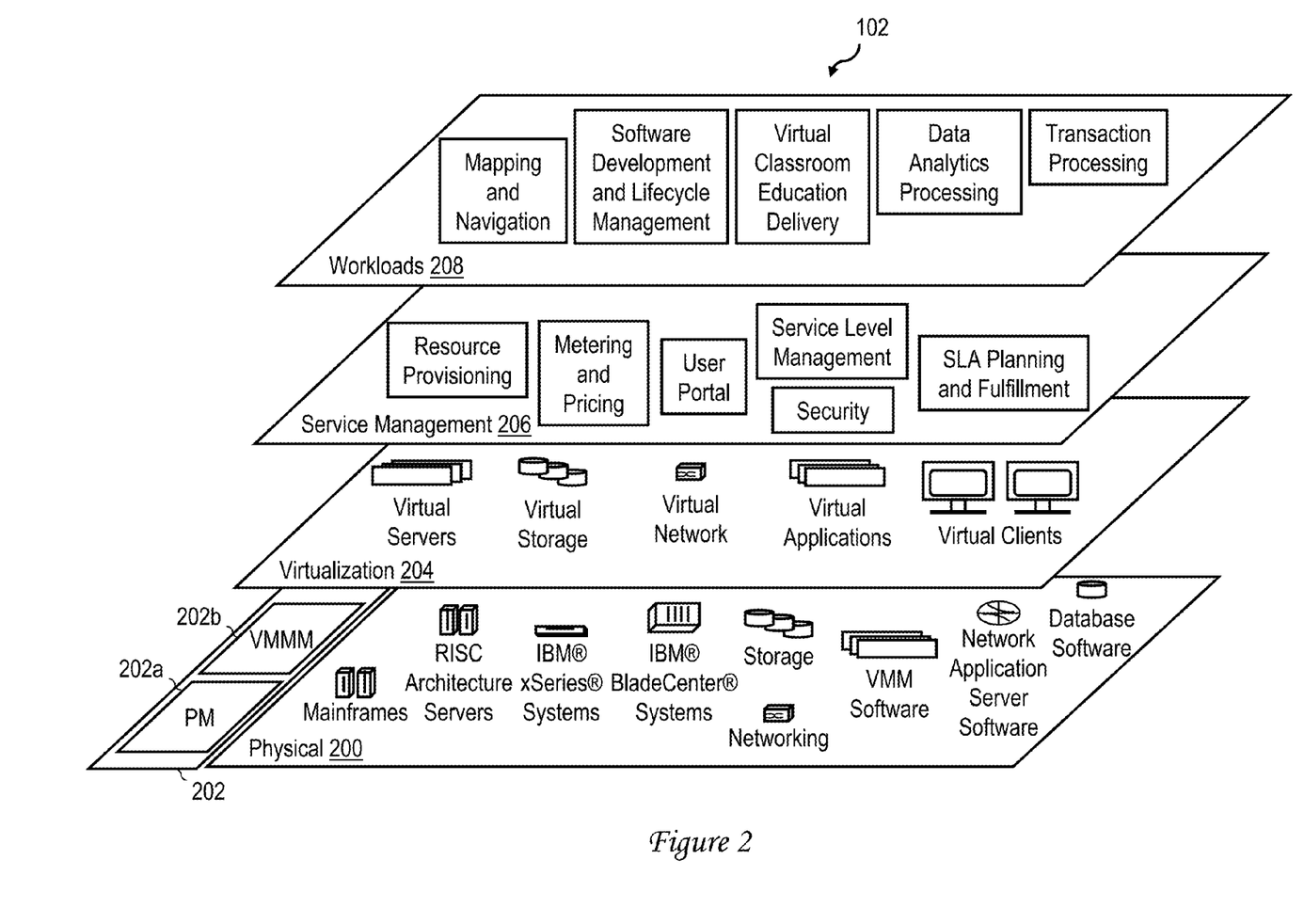
FIG. 2 depicts the layering of virtual and physical resources in the exemplary data processing environment of FIG. 1 in accordance with one embodiment.

FIG. 2 is a layer diagram depicting the virtual and physical resources residing in collection of cloud 102 of FIG. 1 in accordance with one embodiment. It should be understood that the computing resources, layers, and functions shown in FIG. 2 are intended to be illustrative only and embodiments of the claimed inventions are not limited thereto.

As depicted, cloud 102 includes a physical layer 200, a virtualization layer 204, a service management layer 206, and a workloads layer 208. Physical layer 200 includes various physical hardware and software components that can be used to instantiate virtual entities for use by the cloud service provider and its customers. As an example, the hardware components may include mainframes (e.g., IBM® zSeries® systems), reduced instruction set computer (RISC) architecture servers (e.g., IBM pSeries® systems), IBM xSeries® systems, IBM BladeCenter® systems, storage devices (e.g., flash drives, magnetic drives, optical drives, tape drives, etc.), physical networks, and networking components (e.g., routers, switches, etc.). The software components may include a virtual machine monitor (VMM) or hypervisor software, operating system software (e.g., AIX, Windows, Linux, VMware, Android, etc.), network application server software (e.g., IBM WebSphere® application server software, which includes web server software), and database software (e.g., IBM DB2®, database software). IBM, zSeries, pSeries, xSeries, BladeCenter, WebSphere, and DB2 are trademarks of International Business Machines Corporation registered in many jurisdictions worldwide.

The resources of physical layer 200 can be administered across cloud 102 in a unified manner through management software 202. In the depicted embodiment, management software 202 includes platform management (PM) software 202a that manages the physical computing platforms, networks and storage resources of physical layer 200, as well as VMM management (VMMM) software 202b that manages hypervisors (VMMs) deployed on the physical computing platforms. Management software 202 may run, for example, on a physical computing platform within physical layer 200 that is designated as a management console.

The computing resources residing in physical layer 200 of cloud 102 are virtualized and managed by one or more hypervisors. The hypervisors present a virtualization layer 204 including virtual entities (e.g., virtual servers, virtual storage, virtual networks (including virtual private networks)), virtual applications, and virtual clients. As discussed previously, these virtual entities, which are abstractions of the underlying resources in physical layer 200, may be accessed by client devices 110 of cloud consumers on-demand.

The hypervisor(s) also support a service management layer 206 that implements various management functions for cloud 102. These management functions can be directly implemented by the hypervisor(s) and/or by one or more management or service VMs running on the hypervisor (s) and may provide functions such as resource provisioning, metering and pricing, security, user portal services, service level management, and SLA planning and fulfillment. The resource provisioning function provides dynamic procurement of computing resources and other resources that are utilized to perform tasks within the cloud computing environment. The metering and pricing function provides cost tracking (as resources are provisioned and utilized within the cloud computing environment) and billing or invoicing for consumption of the utilized resources. As one example, the utilized resources may include application software licenses. The security function provides identity verification for cloud consumers and tasks, as well as protection for data and other resources. The user portal function provides access to the cloud computing environment for consumers and system administrators. The service level management function provides cloud computing resource allocation and management such that required service levels are met. For example, the security function or service level management function may be configured to limit deployment/migration of a virtual machine (VM) image to geographical location indicated to be acceptable to a cloud consumer. The service level agreement (SLA) planning and fulfillment function provides pre-arrangement for, and procurement of, cloud computing resources for which a future requirement is anticipated in accordance with an SLA.

Workloads layer 208, which may be implemented by one or more consumer VMs, provides examples of functionality for which the cloud computing environment may be utilized. Examples of workloads and functions which may be provided from workloads layer 208 include: mapping and navigation; software development and lifecycle management; virtual classroom education delivery; data analytics processing; and transaction processing. Of course, the workloads present in workloads layer 208 will vary between embodiments depending upon the needs and desires of cloud consumers.

Figure 3:
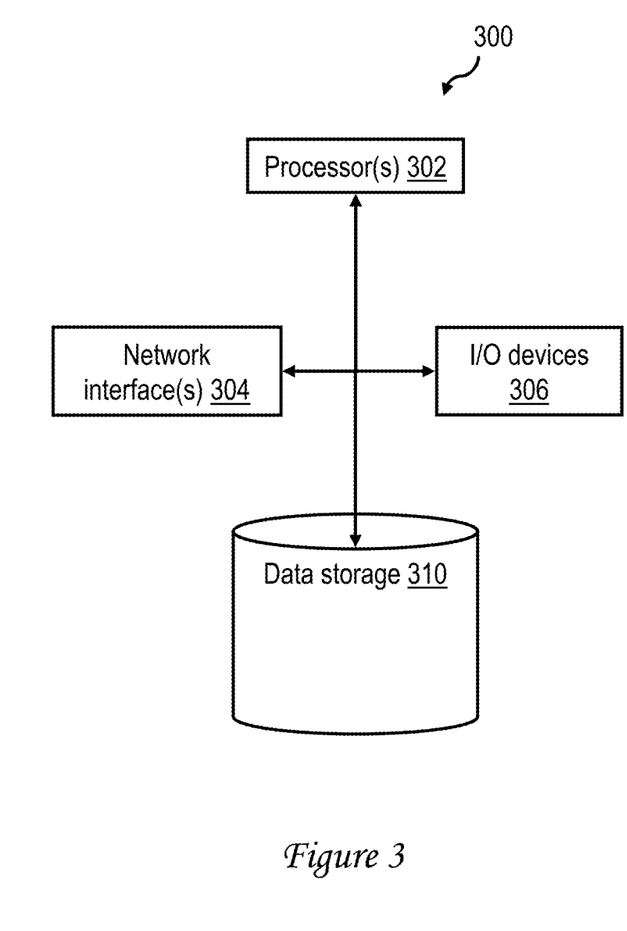
FIG. 3 is a high level block diagram of a data processing system in accordance with one embodiment.

With reference now to FIG. 3, there is illustrated a high level block diagram of an exemplary data processing system 300 that can be utilized to implement a physical host computing platform in physical layer 200 of FIG. 2 or a client device 110 of FIG. 1. In the illustrated exemplary embodiment, data processing system 300 includes one or more network interfaces 304 that permit data processing system 300 to communicate with one or more computing resources in cloud 102 via cabling and/or one or more wired or wireless, public or private, local or wide area networks (including the Internet). Data processing system 300 additionally includes one or more processors 302 that process data and program code, for example, to manage, access and manipulate data or software in data processing environment 100. Data processing system 300 also includes input/output (I/O) devices 306, such as ports, displays, and attached devices, etc., which receive inputs and provide outputs of the processing performed by data processing system 300 and/or other resource(s) in data processing environment 100. Finally, data processing system 300 includes data storage 310, which may include one or more volatile or non-volatile storage devices, including memories, solid state drives, optical disks, magnetic disk drives, tape drives, etc. Data storage 310 may store, for example, software within physical layer 200 and/or software, such as a web browser, that facilitates access to workloads layer 208 and/or service management layer 206.

Figure 4:
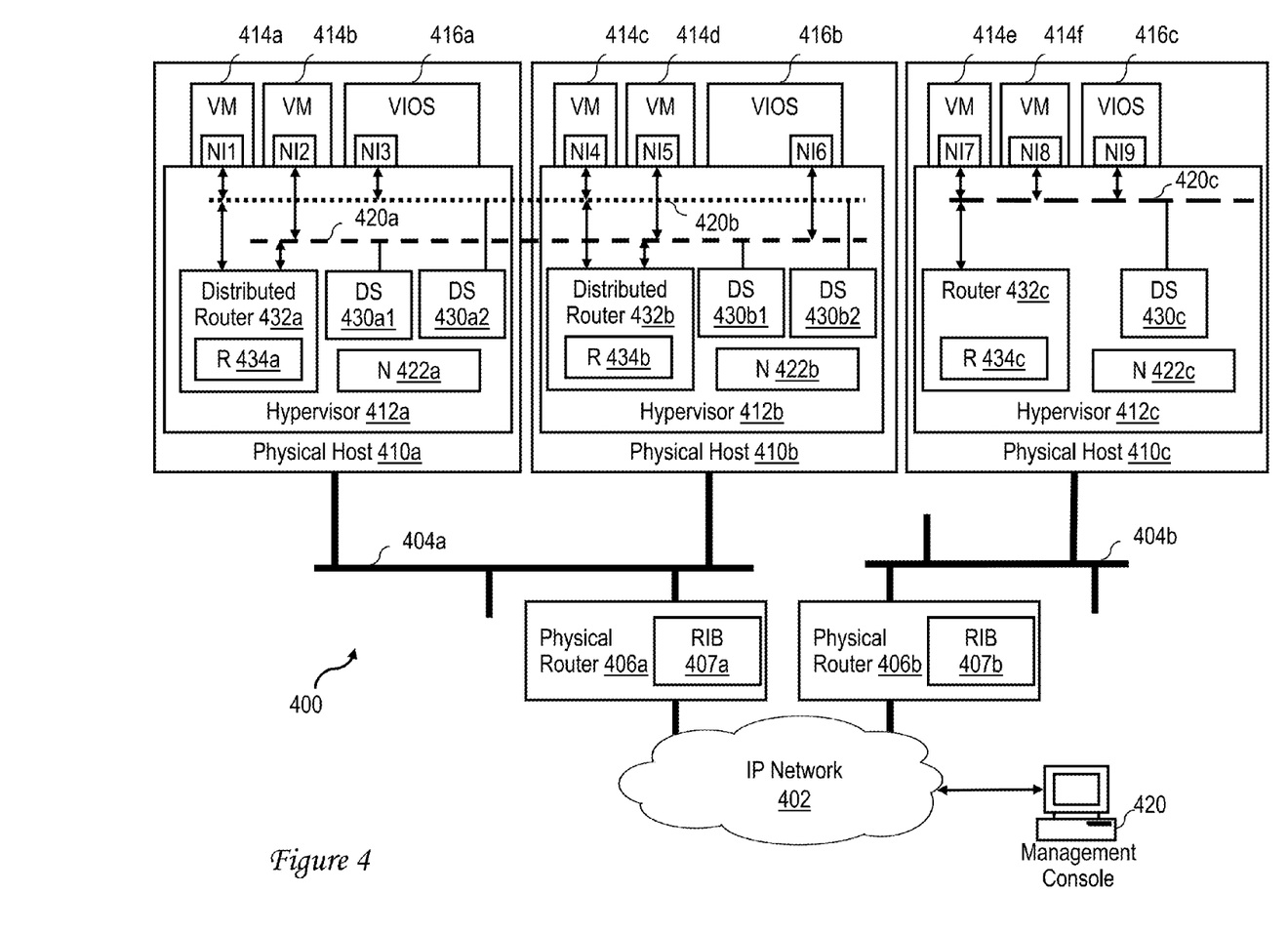
FIG. 4 is a first high level block diagram of a portion of a data processing environment employing virtual networking in accordance with one embodiment.

Referring now to FIG. 4, there is depicted a high level block diagram of a portion of a data processing environment 400 employing virtual networking in accordance with one embodiment. For example, data processing environment 400 can implement a portion of cloud 102 depicted in FIG. 1.

In the depicted embodiment, data processing environment 400 includes an Internet protocol (IP) network 402 including a plurality of network segments 404*a*, 404*b*, each of which is coupled to a respective one of physical routers 406*a*, 406*b*. As is known in the art, each of physical routers 406*a*, 406*b* includes a respective routing information base (RIB) 407*a*, 407*b* by which physical routers 406*a*, 406*b* route incoming data packets toward the packets' destinations based upon OSI Layer 3 (e.g., Internet Protocol (IP)) addresses contained in the packets. Physical hosts 410*a*, 410*b* are coupled to network segment 404*a*, and physical host 410*c* is coupled to network segment 404*b*. Each of physical hosts 410*a*-410*c* can be implemented, for example, utilizing a data processing system 300 as depicted in FIG. 3.

Each of physical hosts 410*a*-410*c* executes a respective one of hypervisors (or VMMs) 412*a*-412*c*, which virtualizes and manages the resources of its respective physical host 410, for example, under the direction of a human and/or automated cloud administrator at a management console 420 coupled to physical hosts 410*a*-410*c* by Internet Protocol (IP) network 402. Hypervisor 412*a* on physical host 410*a* supports the execution of VMs 414*a*-414*b*, hypervisor 412*b* on physical host 410*b* supports the execution of VMs 414*c*-414*d*, and hypervisor 412*c* on physical host 410*c* supports the execution of VMs 414*e*-414*f*. In various embodiments, VMs 414*a*-414*f* can include VMs of one or more cloud consumers and/or a cloud provider. Hypervisors 412 further support the execution of specialized VMs, referred to herein as Virtual I/O Servers (VIOSs) 416*a*-416*c*, which are dedicated to providing input/output services including networking to VMs 414*a*-414*f*. In the depicted embodiment, each of VMs 414 and VIOSs 416 has at least one virtual network interfaces NI1-NI9, which provides network connectivity at least at Layers 2 and 3 of the OSI model.

As depicted, each of hypervisors 412*a*-412*c* provides one or more virtual networks to which its VMs 414 can attach. To visually distinguish them from physical subnetworks 404*a*-404*b*, virtual networks are represented in FIG. 4 in dashed line illustration. For example, in the depicted embodiment, hypervisors 412*a*-412*b* provide a first virtual network 420*a* through the implementation of distributed switches (DSs) 430*a*1 and 430*b*1 providing Layer 2 connectivity. hypervisors 412*a*-412*b* similarly provide a second virtual network 420*b* through the implementation of distributed switches 430*a*2 and 430*b*2. In addition, hypervisor 412*c* provides a third virtual network 420*c* through the implementation of distributed switch 430*c*. In various embodiments, each of virtual networks 420*a*-420*c* can be, for example, a private network of a particular cloud consumer, a collaborative private network shared by multiple cloud consumers and/or a cloud provider, or a public network. In the depicted example, network interfaces NI2, NI5 and NI6 are connected to first virtual network 420*a*, network interfaces NI1, NI3, and NI4 are connected to second virtual network 420*b*, and network interfaces NI7, NI8 and NI9 are connected to third virtual network 420*c*. Each hypervisor 412 preferably records information regarding the virtual network(s) 420 it supports and the connection of its VMs 414 and VIOS(s) 416 to the virtual network(s) 420 as a respective one of network information 422*a*, 422*b* and 422*c*. For example, a hypervisor 412 can create an entry in its network information 422*a*, 422*b* or 422*c* for one of its VMs 414 and/or VIOSs 416 when the corresponding entity is provisioned, deployed or migrated in, and can remove the entry when the corresponding entity is migrated out or destroyed.

To support communication between virtual networks 420*a*-420*c* and between virtual networks 420 and physical networks 402 and/or 404, hypervisors 412*a*-412*c* each implement a respective one of distributed routers 432*a*-432*c* to provide OSI Layer 3 routing. In the depicted embodiment, each distributed router 432 provides a respective network interface for each virtual network 420 instantiated by its hypervisor 412, as well as a network interface to the physical network segment 404 to which its physical host 410 is attached (e.g., through a software port of a physical network interface 304). Each distributed router 432 additionally includes a respective routing information base (R) 434*a*, 434*b* and 434*c* for storing route information. In at least one embodiment, the implementation of a distributed router 432 in each hypervisor 412 supporting a VM 414 having virtual networking capability frees physical routers 406 from having to learn and record in forwarding tables 407 routes to VMs 414, which may migrate frequently among the various physical hosts 410 in data processing environment 400 for performance, load balancing, security, power management and/or other considerations. In alternate embodiments, a hypervisor 412 may create a respective instantiation of a distributed router for each of multiple cloud consumers, such that each distributed router instance forwards packets between a given cloud consumer's virtual networks, but not between virtual networks of different cloud consumers.

In a virtualized network environment such as exemplary virtualized network environment 400, it is desirable to filter network communications between VMs, for example, by limiting traffic between a public internet-facing server and an intranet server or by blocking traffic between the VMs of different customers. In the prior art, control of network communication between VMs is implemented utilizing IPsec tunneling, which requires nontrivial setup on each VM, or by using a firewall on a physical router to filter network traffic. Either of these prior art techniques of network filtering significantly degrades network communication performance for the VMs.

Figure 5:
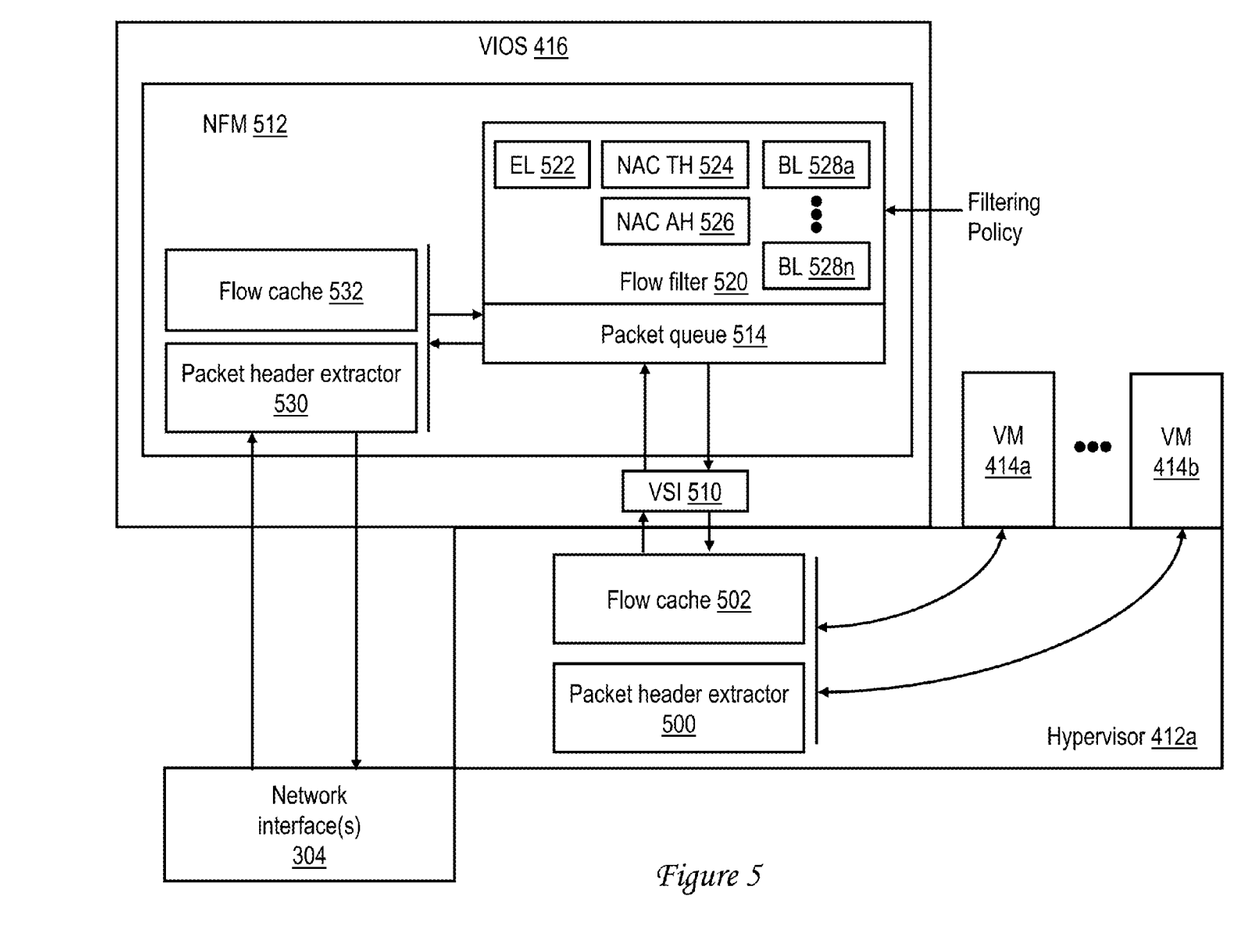
FIG. 5 is a more detailed view of components of a virtual I/O server (VIOS) and hypervisor that support policy-based network filtering in accordance with one embodiment.

With reference now to FIG. 5, there is illustrated a more detailed view of the components of a hypervisor 412 and VIOS 416 that can be utilized in one exemplary embodiment to provide network filtering (and/or isolation) in a virtualized network environment such as exemplary network environment 400 of FIG. 4. As shown in FIG. 5, hypervisor 412*a*, which supports execution of VMs 414*a* and 414*b*, is equipped with a packet header extractor 500 and a flow cache 502 utilized to cache dispositions (e.g., drop or forward) of packets in packet flows to and from VMs 414 as described further below. Flow cache 502 further communicates via a virtual server interface 510 with a network filtering module (NFM) 512, which can be implemented, for example, in the kernel of VIOS 416.

NFM 512 includes a flow filter 520 having an associated packet queue 514 for packets awaiting disposition determinations. Flow filter 520 makes disposition determinations for packets in flows not found in flow cache 502 by reference to a number of policy data structures, which in the illustrated embodiment include an exclusion list 522, a network access control (NAC) trusted host (TH) list 524, a NAC allowed host (AH) list 526, and a respective bypass list 528*a*-528*n* for one or more protocols. These policy data structures can be established and/or updated, for example, via a security administration tool running on management console 420.

Exclusion list 522 is utilized to identify IP addresses of zero or more VMs 414 for which data traffic is exempted from filtering if the other endpoint of the data traffic is also a VM 414 whose IP address is likewise identified in exclusion list 522.

NAC AH list 526 is utilized to define the IP addresses of a set of zero or more allowed VMs 414 to which any VM 414 can communicate via a network connection. VMs 414 that are not otherwise permitted by the filtering policy to employ network communication (referred to herein as quarantined VMs 414) can thus still conduct network communication with the allowed VMs 414, if any. NAC TH list 524 is utilized to define the IP addresses of a set of VMs 414 that are not subject to quarantine, and thus, whose packets need not be checked against NAC AH list 526.

Bypass list(s) 528a-528n comprise zero or more lists, each defining for a respective protocol the IP addresses (and optionally, by additional qualifying criteria such as port number) of VMs 414 whose traffic is not to be checked against the filtering policy. Appropriate VMs 414 for inclusion on bypass lists 528a-528n can include, for example, internal backup servers or vulnerability scanners.

As further indicated in FIG. 5, NFM 512 may optionally implement an additional packet header extractor 530 and associated flow cache 532 utilized to make disposition determinations for packets communicated with external network(s) via network interface(s) 304. Although FIG. 5 illustrates an embodiment in which inter-VM flows and flows over external networks are processed utilizing separate packet header extractors and flow caches, in alternative embodiments a unified packet header extractor and flow cache can be utilized for both types of flows. Further, the packet header extractor(s) and flow cache(s) can be implemented in hypervisor 412a and/or VIOS 416.

Figure 6:
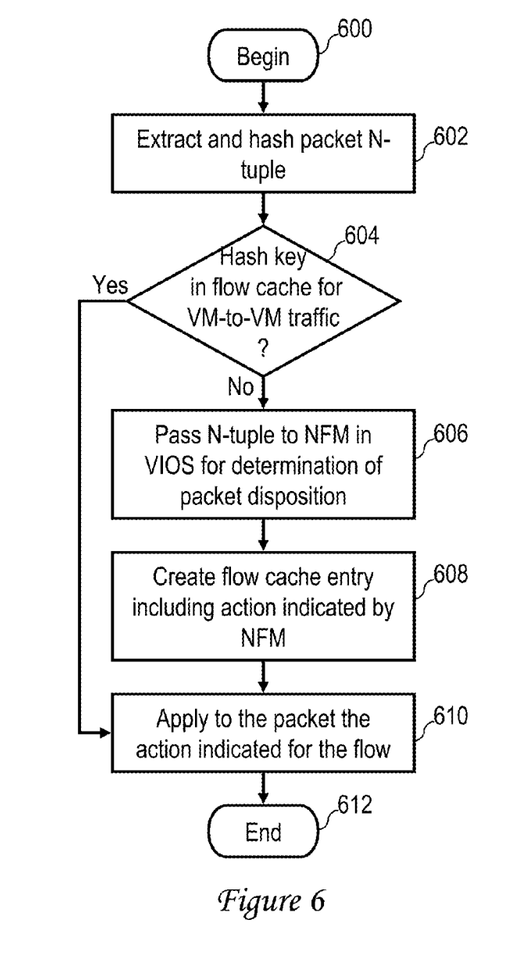
FIG. 6 is a high level logical flowchart of an exemplary process for network filtering in a virtual network environment in accordance with one embodiment.

Referring now to FIG. 6, there is depicted a high level logical flowchart of an exemplary process by which policy-based network filtering is implemented in a virtualized environment in accordance with one embodiment. As with the other logical flowcharts presented herein, steps are presented in logical rather than strictly chronological order, meaning that in some embodiments at least some steps may be performed in a different order than illustrated or concurrently. To promote understanding, FIG. 6 is described with reference to the exemplary embodiment illustrated in FIG. 5.

The process begins at block 600, for example, in response to receipt of packet to or from a VM 414a, 414b at a packet header extractor 500 or 530. In response to receipt of the packet, packet header extractor 500 or 530 scans the packet header(s), extracts a predetermined N-tuple from the packet header(s), and hashes the N-tuple to obtain a hash key. For example, in one preferred embodiment, the N-tuple is a 5-tuple including the transport layer protocol (e.g., TCP, UDP, etc.), network layer (e.g., IP) source address, network layer (e.g., IP) destination address, source port and destination port. In other embodiments, the N-tuple could alternatively or additionally include Layer 2 (e.g., MAC) source and/or destination addresses, virtual local area network (VLAN) identifiers, etc. As depicted at block 604, packet header extractor 500 or 530 passes the hash key to the associated flow cache 502 or 532 to invoke a cache lookup.

Figure 7:
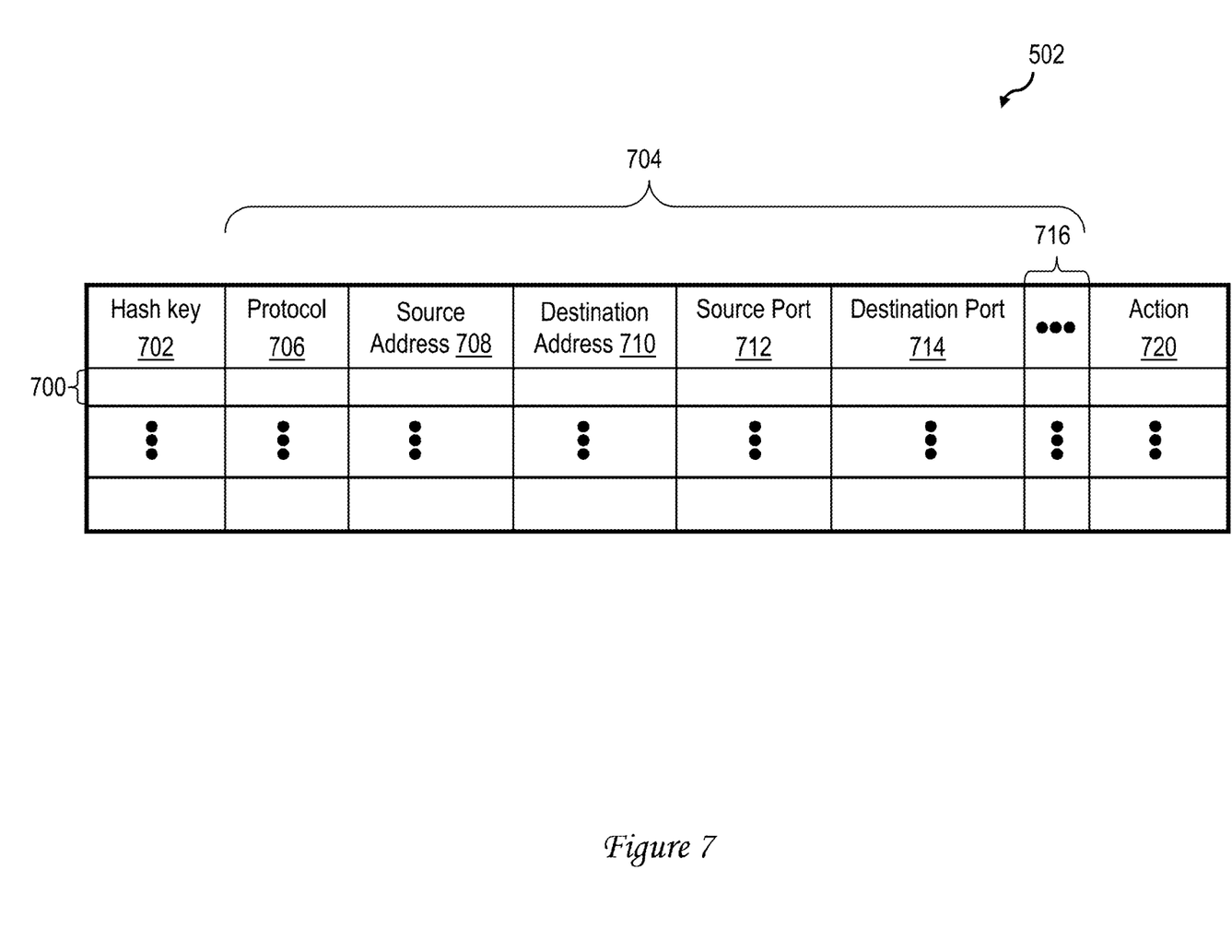
FIG. 7 illustrates an exemplary embodiment of a flow cache in FIG. 5 in accordance with one embodiment.

FIG. 7 illustrates an exemplary embodiment of flow cache 502. As shown, the exemplary embodiment of flow cache 502 includes multiple entries 700 having a number of fields, including a hash key field 702 for holding a hash key of a packet flow, a plurality of N-tuple fields 704 for holding the N tuple values hashed to obtain the hash key, and an action field 720 for indicating a disposition (e.g., drop or forward) for packets in the packet flow. FIG. 7 illustrates one preferred embodiment in which N-tuple fields 704 include a protocol field 706 indicating the transport layer protocol of a packet flow, source address field 708 indicating the network layer source address of the packet flow, destination address field 710 indicating the network layer destination address of the packet flow, source port field 712 indicating the source port of the packet flow, destination port field 714 indicating the destination port of the packet flow, and zero or more additional tuple fields 716. Thus, given the hash key generated by packet header extractor 500 or 530 from the packet header(s), a flow cache 502 or 532 determines if it holds a corresponding entry 700, and if so, indicates the appropriate disposition (e.g., forward or drop) for the packet.

Returning to block 604 of FIG. 6, in response to a determination at block 604 that the hash key generated from the packet header was resident in the flow cache 502 or 532, the process proceeds to block 610, which illustrates the packet being dropped or forwarded in accordance with the action associated with the hash key in the flow cache 502 or 532. Thus, in the case of a VM-to-VM flow, hypervisor 412a applies the policy recorded in flow cache 502 by either dropping the packet or forwarding the packet directly to its destination VM 414a or 414b. Similarly, in the case of a packet flow between a VM 414 and an external network, NFM 512 can apply the policy recorded in flow cache 532 by either dropping the packet or forwarding the packet toward its destination. As will be appreciated, network performance is improved in that the desired policy can be implemented without passing the packet to an external router (e.g., physical router 406a) and without configuring an IPsec tunnel or the like between the source and destination VMs. Following block 610, the process illustrated in FIG. 6 ends at block 612.

Referring again to block 604, in response to a determination that the hash key generated from the packet is not resident in the flow cache 502 or 532, the flow cache 502 or 532 passes the N-tuple of the packet to NFM 512 for determination of the disposition of the packet (block 606). In response to receipt of the N-tuple, NFM 512 determines and reports the disposition of the packet by reference to policy data structures, which in the embodiment of FIG. 5 include exclusion list 522, network access control (NAC) trusted host (TH) list 524, NAC allowed host (AH) list 526, and a respective bypass list 528a-528n for one or more protocols. An exemplary process by which NFM 512 determines the disposition of a packet by reference to these policy data structures is described below with reference to FIG. 9. As illustrated at block 608, flow cache 502 or 532 allocates a new entry 700 and populates it with the hash key, N-tuple and disposition determined by NFM 512. In addition, as depicted at block 610, hypervisor 412a or VIOS 416 applies to the packet the disposition indicated by NFM 512, for example, by dropping or forwarding the packet. Following block 610, the process of FIG. 6 ends at block 612.

In the method of FIG. 6, as a first packet in a packet flow is first encountered NFM 512 is consulted to make a disposition determination for packets in the packet flow, as depicted at block 606. After dispositions of the first one or two packets in the packet flow are determined, dispositions of subsequent packets having a common N-tuple can thereafter be made more rapidly by reference to flow cache 502 or 532, as shown at blocks 604 and 610. Flow caches 502, 532 preferably replace their entries 700 as needed based on a least recently used (LRU) or other replacement algorithm and flush all of their entries 700 in response to an update to one or more of the policy data structures. Following the replacement or flushing of the relevant entry 700, the disposition of packets in a packet flow will again need to be determined by NFM 512.

Figure 8:
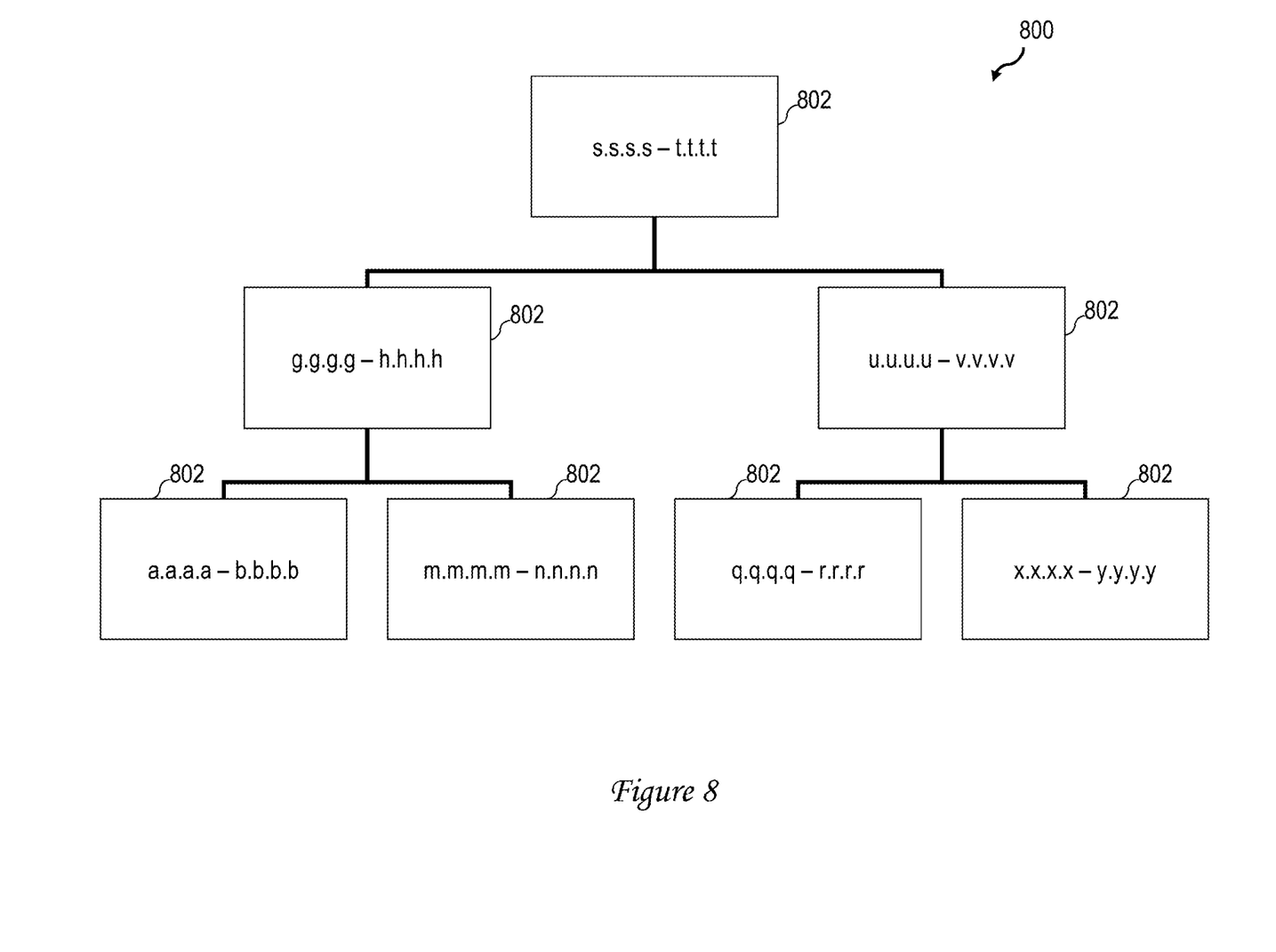
FIG. 8 depicts an exemplary tree data structure that can be utilized to implement any of the filtering policy data structures depicted in FIG. 5.

Referring now to FIG. 8, there is depicted an exemplary M-ary tree 800 that can be utilized to implement any of policy data structures 522, 524, 526 and 528a-528n. M-ary tree 800 includes a plurality of nodes 802, each specifying a starting network layer (e.g., IP) address and an ending network layer (e.g., IP) address (which can be the same if the node identifies a single address). Although M-ary tree 800 is illustrated as a binary tree, those skilled in the art will appreciate that M-ary tree 800 (or branches thereof) can be ternary, quaternary, etc.

Figure 9:
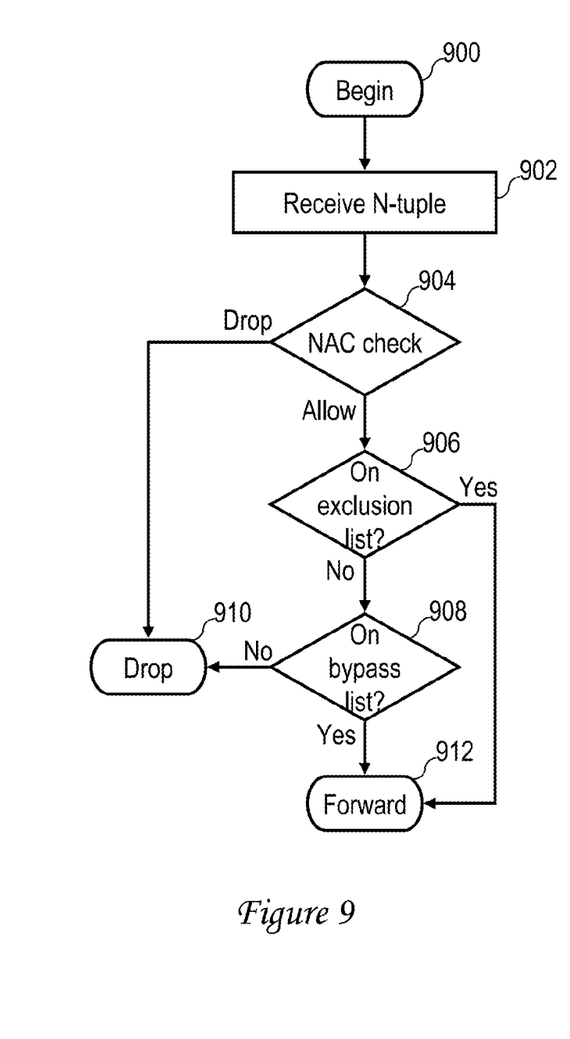
FIG. 9 is a high level logical flowchart of the operation of the VIOS flow filter of FIG. 5 in accordance with one embodiment.

With reference now to FIG. 9, there is illustrated a high level logical flowchart of the operation of the VIOS flow filter 520 of FIG. 5 in accordance with one embodiment. As illustrated the process begins at block 900 and then proceeds to block 902, which illustrates flow filter 902 receiving an N-tuple of a packet from a flow cache 502 or 532. In response to receipt of the N-tuple of the packet, flow filter 520 checks the packet against policy data structures 522, 524, 526 and 528a-528n at blocks 904-908, either serially or in parallel.

At block 904, flow filter 520 determines if the network layer source address identified in the N-tuple is identified in the NAC TH list 524 or if the network layer destination address identified in the N-tuple is identified in the NAC AH list 526. If the source address identified in the N-tuple is identified in the NAC TH list 524 or the destination address identified in the N-tuple is identified in the NAC AH list 526, a further check against exclusion list 522 and bypass lists 528a-528n is made at blocks 906 and 908. Otherwise, flow filter 520 determines that the packet should be dropped, as indicated at block 910.

At block 906, flow filter 520 determines if the source address and destination address of the packet are both identified in exclusion list 522. If so, flow filter 520 determines that the packet should be forwarded to its destination, as indicated at block 912. If, however, the source and destination addresses of the packet are not both identified in exclusion list 522, the filtering provided by bypass lists 528a-528n are determinative. That is, if the source address of the packet is determined at block 908 to be on the bypass list 528 corresponding to the protocol indicated by the N-tuple, flow filter 520 determines that the packet should be forwarded, as indicated at block 912. If, on the other hand, flow filter 520 determines that the source address of the packet is not on the bypass list 528 corresponding to the protocol indicated by the N-tuple, flow filter 520 determines that the packet is to be dropped, as indicated at block 910.

As has been described, in some embodiments, a physical host executes a virtual machine monitor or hypervisor that instantiates at least one virtual machine (VM) and a virtual input/output server (VIOS). The VIOS determines by reference to a policy data structure a disposition of a packet of network communication with the VM, where the disposition includes one of dropping the packet and forwarding the packet. Thereafter, the determined disposition is applied to a subsequent packet in a same packet flow as the packet.

While the present invention has been particularly shown as described with reference to one or more preferred embodiments, it will be understood by those skilled in the art that various changes in form and detail may be made therein without departing from the spirit and scope of the invention. For example, it should be understood that although the detailed description provided herein provides multiple embodiments of cloud computing environments, the teachings disclosed herein are not limited to cloud computing environments. Rather, embodiments can be implemented in any other type of computing environment now known or later developed, including client-server and peer-to-peer computing environments.

Further, although aspects have been described with respect to computer systems executing program code that direct the functions described herein, it should be understood that embodiments may alternatively be implemented as a program product including a tangible data storage medium/device (e.g., data storage 310) storing program code that can be processed by a data processing system to cause the data processing system to perform one or more of the described functions.

What is claimed is:

1. A method of data processing, comprising:
   a physical host executing a virtual machine monitor (VMM) that instantiates at least one virtual machine (VM) separate from and hosted by the VMM, wherein the VM is configured as a virtual input/output server (VIOS) that provides input/output services for network communication;
   the VMM implementing a virtual switch, a virtual network, and a virtual router;
   utilizing the virtual switch and the virtual router of the VMM, performing routing and switching for network communication between a plurality of other VMs on the virtual network;
   the VIOS receiving a packet of network communication between the plurality of other VMs on the virtual network and, in response to receiving the packet, the VIOS determining by reference to a policy data structure a disposition of the packet of network communication, wherein the disposition is dropping the packet;
   caching, in a flow cache of the VMM, the disposition determined by the VIOS, wherein the disposition is cached in the flow cache in association with a key identifying a packet flow containing the packet; and
   thereafter, the VMM accessing the determined disposition in the flow cache and the VMM applying the determined disposition to a subsequent packet in the packet flow containing the packet by reference to the cached disposition and without reference to the policy data structure of the VIOS.

2. The method of claim 1, wherein:
   the key is a hash key; and
   the method further comprises:
       generating the hash key from a tuple of header values in the subsequent packet, wherein the tuple includes at least a network address and an identifier of a protocol of the packet flow, wherein the protocol is above Layer 3; and
       the VMM accessing the determined disposition in the flow cache utilizing the generated hash key.

3. The method of claim 2, wherein:
   the physical host includes a physical network interface; and
   the method further comprises implementing, in the VIOS, a second flow cache for filtering network traffic communicated via the physical network interface.

4. The method of claim 1, wherein:
   the method includes the VIOS maintaining the policy data structure; and
   the policy data structure includes at least one bypass data structure identifying one or more of the plurality of other VMs for which no network filtering by the VIOS is to be enforced.

5. The method of claim 1, wherein:
   the method includes the VIOS maintaining the policy data structure;
   the policy data structure includes an exclusion data structure identifying VMs among the plurality of other VMs excluded from network filtering; and the determining includes determining to forward packets within packet flows between VMs that are all identified in the exclusion data structure.

6. The method of claim 1, wherein:

the method includes the VIOS maintaining the policy data structure; and the policy data structure includes an allowed host data structure identifying at least one allowed VM among the plurality of other VMs with which a quarantined VM that is otherwise disallowed from utilizing network communication is permitted to communicate.

7. The method of claim 1, wherein:

the virtual network is a distributed virtual network spanning a plurality of physical data processing systems including the physical host; and the method further comprises executing the VIOS on a different physical data processing system than at least one of a source VM and a destination VM of the packet flow.

\* \* \* \* \*